C. B. BRISTOL.
Curry Comb.
No. 41,755.
Patented March 1, 1864.
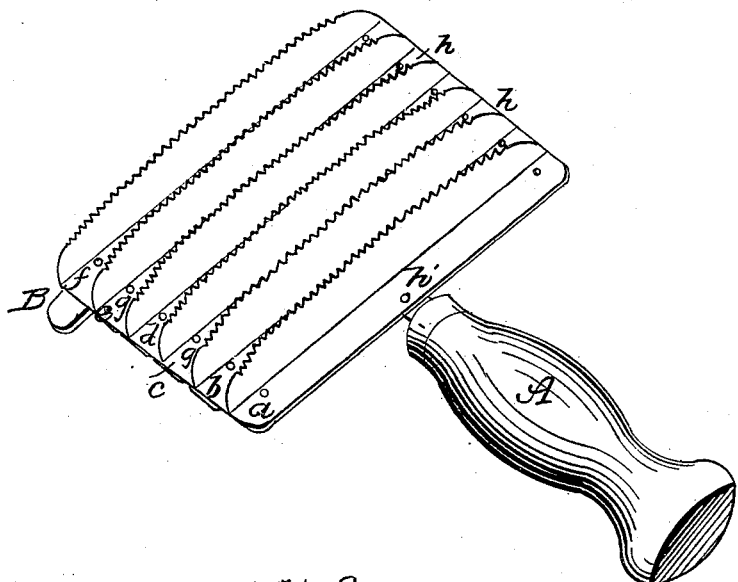
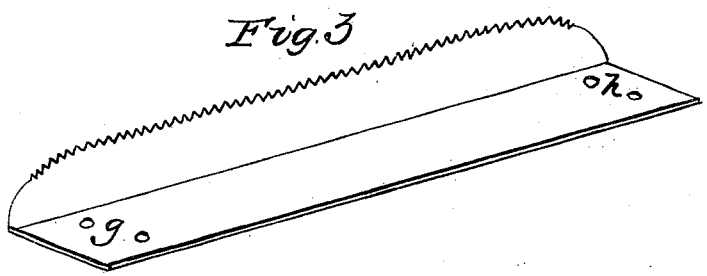
WITNESSES:
H. Beating
R. Fitzgerald
INVENTOR.
Chas. B. Bristol

UNITED STATES PATENT OFFICE.

CHARLES B. BRISTOL, OF NEW HAVEN, CONNECTICUT.

IMPROVEMENT IN CURRY-COMBS.

Specification forming part of Letters Patent No. 41,755, dated March 1, 1864.

*To all whom it may concern:*

Be it known that I, CHARLES B. BRISTOL, of the city and county of New Haven, in the State of Connecticut, have invented a new and useful Improvement in Curry-Combs; and I do hereby declare that the following is a full, clear, and exact description of the construction, character, and operation of the same, reference being had to the accompanying drawings, which make part of this specification, in which—

Figure 1 is a perspective view of the curry-comb, ready for use. Fig. 2 is a cross-section of the same, showing the manner in which the sections are riveted together. Fig. 3 is a perspective view of one of the sectional parts, drawn on a larger scale.

My improvement consists in making the curry-comb wholly of longitudinal sections or strips of sheet metal, each section or strip being bent at right angles longitudinally and riveted together so that each section will lap onto the back of the preceding one in the terrace or clapboard form, in a manner to sustain and strengthen each other.

I make each of the sectional parts—as $a$, $b$, $c$, $d$, $e$, and $f$—of a strip of sheet-iron of the proper thickness, (or of any other suitable material,) by cutting the strips of the length desired for the comb, and of a suitable width—say about one and a half inch. I bend these sections or strips longitudinally at or near right angles, as shown at $a$, $b$, $c$, $d$, $e$, and $f$, Figs. 1 and 2, and also in Fig. 3; and I punch four or more holes in each, as shown at $g$ and $h$, Fig. 3, and indicated in section at $g$, &c., Fig. 2. I rivet these sections or strips together, as indicated in cross-section in Fig. 2. I cut teeth on the edges of these sections in any of the usual ways, and I rivet on the tang or shank $k$ for the handle A, and also the knob or knocker B, in the usual way, so that when finished the whole curry-comb will appear substantially as represented in Fig. 1, and will be ready for use.

The advantages of my improvement consist in that the curry-comb can be made at much less expense in proportion to its strength and durability, as each part or section is shaped by the same swage or former; and in that all the parts or sections are made of narrow strips of sheet-iron, so that there will be no waste; and in that by the regular lapping of the sections or strips the curry-comb will be much stronger in proportion to its weight; and in that the curry-comb can be made of any size to suit purchasers, as any number of sections may be riveted together at pleasure, though, generally, from four to nine.

What I claim as my invention, and desire to secure by Letters Patent, as a new article of manufacture, is—

A curry-comb made wholly of longitudinal sections or strips, when the sections are formed or riveted together substantially as herein described.

CHAS. B. BRISTOL.

Witnesses:
H. KEATING,
R. FITZGERALD.